United States Patent [19]

Propp et al.

[11] Patent Number: 4,988,067
[45] Date of Patent: Jan. 29, 1991

[54] ELECTRICAL BOX HANGER

[76] Inventors: Clarence E. Propp, Rte. 1, Box 120, College Station, 77840; J. Russell Kerr, 19 Cargill La., Bryan, Tex. 77801

[21] Appl. No.: 259,921

[22] Filed: Oct. 19, 1988

[51] Int. Cl.$^5$ ............................................. F16M 13/00
[52] U.S. Cl. .................................. 248/343; 248/906; 411/389
[58] Field of Search ................. 248/343, DIG. 6, 342; 220/3.3, 3.9; 52/39; 411/389, 399, 107, 999

[56] References Cited

U.S. PATENT DOCUMENTS

| | | | |
|---|---|---|---|
| 228,429 | 6/1880 | Williams | 411/389 X |
| 519,411 | 5/1894 | North | 411/396 |
| 701,354 | 6/1902 | Kerr | 248/343 X |
| 1,438,607 | 12/1922 | Kempton | 411/389 X |
| 1,926,925 | 9/1933 | Wescott | 411/389 X |
| 1,968,516 | 7/1934 | Dieter | 411/399 |
| 3,124,189 | 3/1964 | Dietlein | 411/107 X |
| 3,141,686 | 7/1964 | Smith et al. | 411/389 X |
| 3,268,190 | 8/1966 | Hansen | 220/3.3 X |
| 3,782,437 | 1/1974 | Seckerson | 411/999 X |
| 4,496,259 | 1/1985 | Foucher | 411/389 X |
| 4,684,092 | 8/1987 | Reiker | 248/343 X |
| 4,754,947 | 7/1988 | Propp | 248/343 X |
| 4,788,383 | 11/1988 | Caison | 248/343 X |

FOREIGN PATENT DOCUMENTS 8145 of 1909 United Kingdom ................ 411/389

Primary Examiner—Alvin C. Chin-Shue

[57] ABSTRACT

A hanger assembly for attachment to a construction member or other commerically available ceiling fan support. The hanger assembly has an electrical box and a pair of support rods. The electrical box is a standard electrical box which has been modified by adding a pair of holes in the back thereof, each of the holes being in axial alignment with the respective threaded hole of the corresponding electrical box ear. Each of the support rods has a first threaded end section, a second threaded end section, a smooth section adjacent to the first threaded end section and a spline section intermediate the second threaded end section and the smooth section. The respective support rod is secured to the back of the electrical box after the first threaded end section is inserted into the corresponding back hole. The spline section of the respective support rod is in frictional engagement with the corresponding threaded ear hole. A load support member is secured to the hanger assembly by utilizing the second threaded end sections and corresponding nuts.

2 Claims, 1 Drawing Sheet

U.S. Patent   Jan. 29, 1991   Sheet 1 of 1   4,988,067
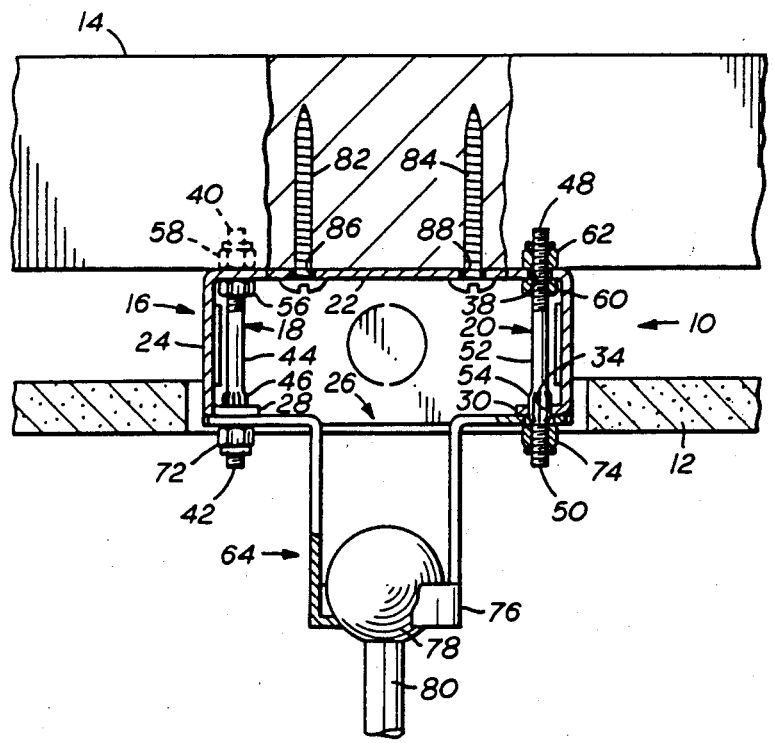
FIG. 1
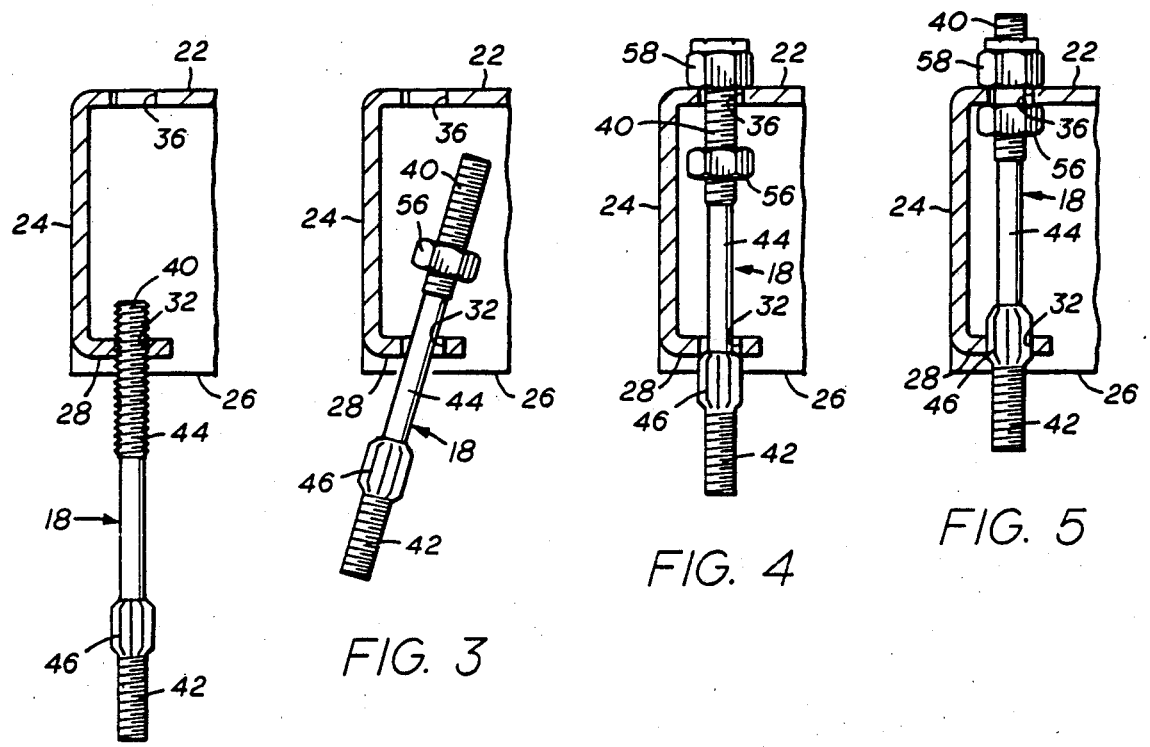
FIG. 2
FIG. 3
FIG. 4
FIG. 5

4,988,067

ELECTRICAL BOX HANGER

FIELD OF THE INVENTION

This invention relates to a hanger assembly and, more particularly, relates to a heavy-duty hanger for ceiling fans, heavy lighting fixtures, potted plants, chairs, etc.

BACKGROUND OF THE INVENTION

Standard electrical trade installation methods for ceiling electrical boxes in new construction will safely hold approximately a 35-pound static load. Ceiling fans, for example, present from 25-pound to 100-pound dynamic loads. Therefore, modifications must be made to safely hang heavier dynamic loads.

The conventional method for installing a heavy-duty hanger is to add a structural piece, e.g. a 2"×4" wooden beam, between the ceiling joists from which the electrical box and ceiling fan or other device is hung, unless it is hung from a ceiling joist or any commercial ceiling fan support which may be conveniently located. Heretofore, the ceiling fan support member was attached via a pair of screws to the ears of the secured electrical box. However, such screws were susceptible to loosening as a result of fan vibration and the ears subject to fatiguing forces. As such, there exists a need to enhance the attachment and mechanical integrity of a standard electrical box when utilized as part of a heavy-duty hanger assembly.

These, and other limitations and disadvantages of the prior art, are overcome with the present invention and commercially acceptable embodiments of a hanger assembly and the like are herein provided. Such embodiments utilize a standard electrical box and do not require the use of a special or custom electrical box.

SUMMARY OF THE INVENTION

Accordingly, a feature of the present invention is to provide a hanger assembly which utilizes a standard electrical box.

Another feature is to provide a support rod which significantly improves both the static and dynamic load bearing capacity of a standard electrical outlet box ear.

The foregoing features and other features of the hanger assembly of this invention are realized in the hereinafter described embodiment thereof. The hanger assembly will normally be attached to an existing construction member, e.g. a ceiling joist if conveniently located, or to an added construction member, e.g. a 2"×4" wooden beam, secured to and installed between a pair of ceiling joists or to any available commercial fan support. The hanger assembly comprises an electrical box having first and second box ears and a pair of support rods. The ears of the electrical box are parallel to the back of the electrical box and in the plane formed by the open face of the electrical box and each of the ears has a threaded hole therethrough perpendicular to the back of the electrical box. The back of the electrical box has a pair of holes therethrough, each of which corresponds to and is in substantial axial alignment with a respective electrical box ear threaded hole. Each of the support rods has a first and second threaded end section, a smooth section adjacent the first threaded end section and a spline section intermediate the smooth and second threaded end section. The spline section has at least one spline, preferably a plurality of splines, axially oriented thereon and the diameter of the spline section is slightly greater than the major diameter of the threaded ear hole. The smooth section diameter is smaller than the minor diameter of the threaded ear hole, thereby allowing the smooth section thereof to freely slide within the ear hole.

The respective support rods are secured to the electrical box by threadedly engaging the first threaded end section thereof with the threaded hole of one of the ears. For example, the first support rod is secured to the first ear by threadedly engaging the first threaded end section thereof with the threaded hole of the first ear. The first support rod is then screwed thereto until the smooth section slidably engages the threaded hole of the first ear. A first nut is then screwed onto the first threaded end section leaving at least one thread between the first nut and the smooth section. The first threaded end section is then inserted into the corresponding hole in the back of the electrical box until the spline section is adjacent to the threaded hole of the first ear. A second nut is then screwed onto the first threaded end section which now extends beyond the back of the electrical box. The second nut is tightened until the first nut tightly rests against the interior surface of the back of the electrical box. As the second nut is tightened to this position, the spline section is drawn into the threaded hole of the first ear, thereby producing a frictional engagement between the spline section and the first ear. The second support rod is likewise installed. A pair of third nuts are placed in threaded engagement with the protruding second threaded sections and are then utilized to secure the load, e.g., ceiling fan, support member to the electrical box.

Once so assembled, the support rods rigidify the electrical box and increase the mechanical strength of the electrical box in the direction of applied load relative to simple attachment of the load support member to the electrical box ears. Additionally, the two point attachment of each of the support rods to the electrical box enhances the attachment integrity thereof by eliminating, or at least minimizing, vibration effects thereon. Furthermore, the pair of support rods provide an antitorque effect operating against the torque forces transmitted by rotating loads, e.g., ceiling fans, to the load support member to further enhance the attachment integrity thereof.

Accordingly, these and other features and advantages of the present invention will become apparent from the following detailed description, wherein reference is made to the figures in the accompanying drawings.

IN THE DRAWINGS

FIG. 1 is a side elevation sectional view of a hanger assembly embodying the concepts of the present invention in an installed position.

FIG. 2 is a partial side elevation of an electrical box in the first phase of installing a support rod.

FIG. 3 is a partial side elevation of the electrical box in FIG. 2 in the second phase of installing the support rod.

FIG. 4 is a partial side elevation of the electrical box in FIG. 2 in the third phase of installing the support rod.

FIG. 5 is a partial side elevation of the electrical box in FIG. 2 in the fourth phase of installing the support rod.

DESCRIPTION

Referring now to the drawings in which like numerals denote similar elements, and more particularly to FIG. 1, there is shown by way of illustration, but not limitation, a hanger assembly 10 mounted above a ceiling 12 of a building and secured to a structural member such as joist 14. The hanger assembly 10 comprises an electrical box 16 and a first and second support rod, 18 and 20 respectively.

The electrical box 16 comprises a box back 22, a perimeter wall 24 which forms an open face 26 opposite the box back 22, and first and second box ears, 28 and 30, respectively. The first and second box ears 28 and 30, respectively, have first and second threaded ear holes 32 and 34, respectively. The box back 22 has a first back hole 36 and a second back hole 38. The first back hole 36 corresponds to and is in axial alignment with the first threaded ear hole 32. Likewise, the second back hole 38 corresponds to and is in axial alignment with the second threaded ear hole 34.

Each of the support rods 18 and 20 comprises a first threaded end section 40 and 48, a second threaded end section 42 and 50, a smooth section 44 and 52 and a spline section 46 and 54, respectively. Utilizing the first support rod 18 as an example, the smooth section 44 is adjacent to the first threaded end section 40 and the spline section 46 is intermediate the second threaded end section 42 and the smooth section 44. The spline section 46 has at least one spline preferably a plurality of splines, being parallel to the main axis of the support rod 18.

A pair of first nuts 56 and 60 and a pair of second nuts 58 and 62 are utilized as means for securing the first threaded end sections 40 and 48 of the respective support rods 18 and 20 once the first threaded end sections 40 and 48 have been inserted through the corresponding back holes 36 and 38, respectively.

The spline sections 46 and 54 of the first and second support rods 18 and 20 frictionally engage the first and second threaded ear holes 32 and 34, respectively, in an installed position.

A load support member 64 is secured to the electrical box 16 by means of a first carrier hole 68 (not shown) and a second carrier hole 70 in conjunction with the second threaded end sections 42 and 50 and a pair of third nuts 72 and 74, respectively. When the support rods 18 and 20 are in an installed position, the second threaded end sections 42 and 50 extend beyond the first and second box ears 28 and 30 opposite the interior of the electrical box 16. The second threaded end sections 42 and 50 are inserted into the first and second carrier holes 68 and 70 and then the third nuts 72 and 74 are brought into threaded engagement with the second threaded end sections 42 and 50, respectively, thereby securing the load support member 64 to the hanger assembly 10.

The load support member 64 has a socket portion 76 which carries a ball portion 73 which is attached to a downwardly extending connecting rod 80 which, in turn, is connected to the load, e.g. ceiling fan.

The electrical box 16 prior to attachment of the load support member 64 has been secured to a construction member such as the wooden joist 14. In the present embodiment, the electrical box 16 has a third and fourth back hole 86 and 88 through which are inserted first and second screws 82 and 84, respectively. The first and second screws 82 and 84 are brought into threaded engagement with the wooden joist 14 and tightened, thereby securing the electrical box 16 to the wooden joist 14.

FIGS. 2–5 depict the four phases of installing a support rod, in particular the first support rod 18. In FIG. 2, the first support rod 18 is secured to the first threaded ear hole 32 by threadedly engaging the first threaded end section 40 with the first threaded ear hole 32. The first support rod 18 is then screwed thereinto until the smooth section 44 slidably engages the first threaded ear hole 32, as shown in FIG. 3. The first nut 56 is then screwed onto the first threaded end section 40 leaving at least one thread between the first nut 56 and the smooth section 44. As shown in FIG. 4, the first threaded end section 40 is then inserted into the first back hole 36 until the spline section 46 is adjacent to the first threaded ear hole 32. The second nut 58 is then screwed onto the first threaded end section 40 which now extends beyond the box back 22. The second nut 58 is tightened until the first nut 56 tightly rests against the interior surface of the box back 22, as shown in FIG. 5. As the second nut 59 is tightened to this position, the spline section 46 is drawn into the first threaded ear hole 32, thereby producing a frictional engagement between the spline section 46 and the first box ear 28. The second support rod 20 is likewise installed.

It will be apparent from the foregoing that many other variations and modifications may be made in the apparatus and methods hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. A hanger assembly for attachment to a construction member or a commercial ceiling fan support bar, said hanger assembly comprising:
   (a) an electrical box, said electrical box comprising:
      (1) a box back,
      (2) a perimeter wall, said perimeter wall attached to and extending perpendicularly from the perimeter of said box back, said perimeter wall forming an open face opposite said box back,
      (3) a first and a second box ear, each of said box ears extending perpendicularly from and attached to said perimeter wall within said open face,
      (4) said first box ear having a first threaded ear hole therethrough in perpendicular alignment to said box back,
      (5) said second box ear having a second threaded ear hole therethrough in perpendicular alignment to said box back,
      (6) said box back having a first back hole and a second back hole, said first back hole corresponding to and in axial alignment with said first threaded ear hole and said second back hole corresponding to and in axial alignment with said second threaded ear hole, and
   (b) a first and a second support rod, each of said support rods comprising:
      (1) a first threaded end section adapted for threaded engagement in a said ear hole,
      (2) a second threaded end section,
      (3) a smooth section adjacent to said first threaded end section, said smooth section having a smaller diameter than a minor diameter of said threaded sections for slideable engagement by said ear holes, and (4) a spline section intermediate said smooth section and said second threaded end section, said spline section having a diameter greater than minor diameters of said threaded end sections with at least one spline being parallel to the main axis of said support rod, (c) means securing said first threaded end sections of the respective support rods to said box back once said first threaded end sections have been inserted through the corresponding back holes, said means comprising a pair of nuts threadedly engaging each of said first threaded end sections of said first and second support rods on opposite sides of said box back, (d) said spline sections of said first and said second support rods frictionally engaging said first and said second threaded ear holes, respectively, and (e) means securing a load to said second threaded sections of said first and said second support rods.

2. The invention of claim 1, wherein said load comprises a ceiling fan.

* * * * *